United States Patent
Demoss

(10) Patent No.: US 10,806,552 B1
(45) Date of Patent: Oct. 20, 2020

(54) PHONE GRIP FLOSS DISPENSER APPARATUS

(71) Applicant: Lisa Demoss, Kemp, TX (US)

(72) Inventor: Lisa Demoss, Kemp, TX (US)

( * ) Notice: Subject to any disclaimer, the term of this patent is extended or adjusted under 35 U.S.C. 154(b) by 0 days.

(21) Appl. No.: 16/552,161

(22) Filed: Aug. 27, 2019

(51) Int. Cl.
| | |
|---|---|
| *B65D 69/00* | (2006.01) |
| *A61C 15/04* | (2006.01) |
| *A45C 11/00* | (2006.01) |
| *A45F 5/00* | (2006.01) |
| *A45C 15/00* | (2006.01) |

(52) U.S. Cl.
CPC ............ *A61C 15/043* (2013.01); *A45C 11/00* (2013.01); *A45C 15/00* (2013.01); *A45F 5/00* (2013.01); *A45C 2011/002* (2013.01); *A45F 2200/0516* (2013.01)

(58) Field of Classification Search
CPC ... A45C 11/00; A45C 15/00; A45C 2011/002; A61C 15/043; A45F 5/00; A45F 2200/0516
USPC ......... 206/37, 38, 320, 460, 581; 455/575.1, 455/575.6, 575.8
See application file for complete search history.

(56) References Cited

U.S. PATENT DOCUMENTS

| | | | |
|---|---|---|---|
| 7,146,184 B1 | 12/2006 | Tsitsiashvili | |
| 8,276,599 B2 | 10/2012 | Gindi | |
| 8,560,031 B2 | 10/2013 | Barnett | |
| 8,833,379 B1 * | 9/2014 | Kaplan | A45D 33/26 132/287 |
| 9,643,767 B2 | 5/2017 | Ziemba | |
| 9,788,640 B2 | 10/2017 | Kroupa | |
| 9,958,107 B1 | 5/2018 | Hobbs | |
| 10,348,352 B2 * | 7/2019 | Barnett | A45F 5/10 |
| 10,389,860 B2 * | 8/2019 | Nahum | H04M 1/04 |
| 10,463,116 B2 * | 11/2019 | Barnett | A44B 99/005 |
| 2003/0000865 A1 * | 1/2003 | Carlino | H04M 1/21 206/581 |
| 2005/0000538 A1 | 1/2005 | Blasi | |
| 2012/0329534 A1 * | 12/2012 | Barnett | G06F 1/1626 455/575.8 |
| 2013/0220847 A1 | 8/2013 | Fisher | |
| 2013/0299365 A1 * | 11/2013 | Andrew | A45F 5/021 206/37 |
| 2019/0211966 A1 * | 7/2019 | Nahum | A45C 11/00 |
| 2019/0281960 A1 * | 9/2019 | Peterson | A45C 11/00 |

* cited by examiner

Primary Examiner — Luan K Bui

(57) ABSTRACT

A phone grip floss dispenser apparatus for securing a cellphone and conveniently dispensing dental floss includes a base. An adhesive is coupled to the base and is configured to secure the base to a cellphone. An expandable grip body has a foldable lower portion and upper portion to move the grip body between a collapsed position and an extended position. A cap bottom is coupled to the upper portion and has a threaded outer lip having a notch. A floss spool is coupled to the cap bottom and has a spool body and a length of dental floss windingly coupled around the spool body. A cap top is coupled to the cap bottom and has an inner threading selectively engageable with the outer lip of the cap bottom to secure the floss spool. The dental floss is dispensed through the notch.

8 Claims, 4 Drawing Sheets

PHONE GRIP FLOSS DISPENSER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to phone accessory devices and more particularly pertains to a new phone accessory device for securing a cellphone and conveniently dispensing dental floss.

(2) Description of Related Art Including Information Disclosed Under 37 CFR 1.97 and 1.98

The prior art relates to phone accessory devices.

BRIEF SUMMARY OF THE INVENTION

An embodiment of the disclosure meets the needs presented above by generally comprising a base having a base inner side and a base outer side. An adhesive is coupled to the base inner side and is configured to secure the base to a cellphone. An expandable grip body has a lower portion and an upper portion. Each of the lower portion and the upper portion is foldable to move the grip body between a collapsed position and an extended position. A cap bottom is coupled to the upper portion and has a threaded outer lip having a notch. The cap bottom has a central spool shaft. A floss spool is coupled to the cap bottom and has a spool body and a length of dental floss windingly coupled around the spool body. The spool body is rotatably coupled around the spool shaft of the cap bottom. A distal end of the length of dental floss is dispensable through the notch of the outer lip. A cap top is coupled to the cap bottom and has an inner threading selectively engageable with the outer lip of the cap bottom to secure the floss spool.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
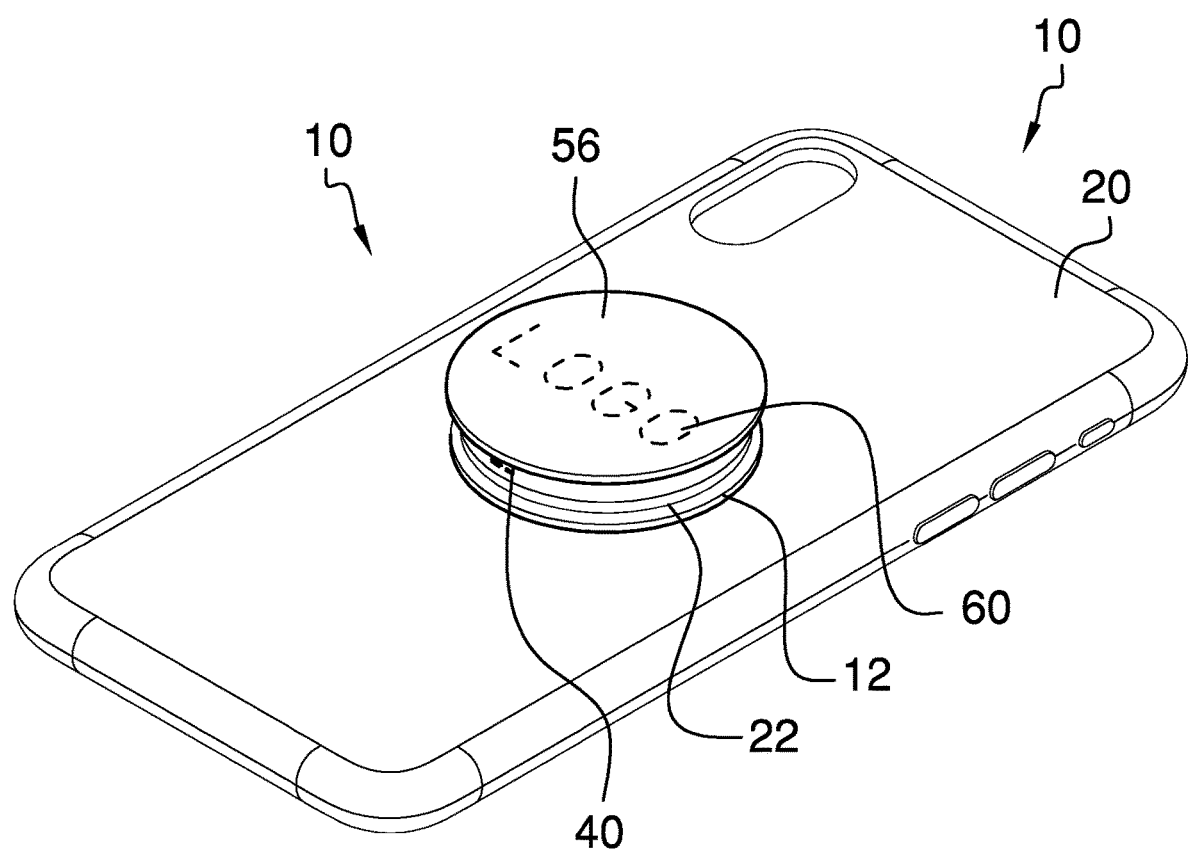
FIG. 1 is an isometric view of a phone grip floss dispenser apparatus according to an embodiment of the disclosure.
Figure 2:
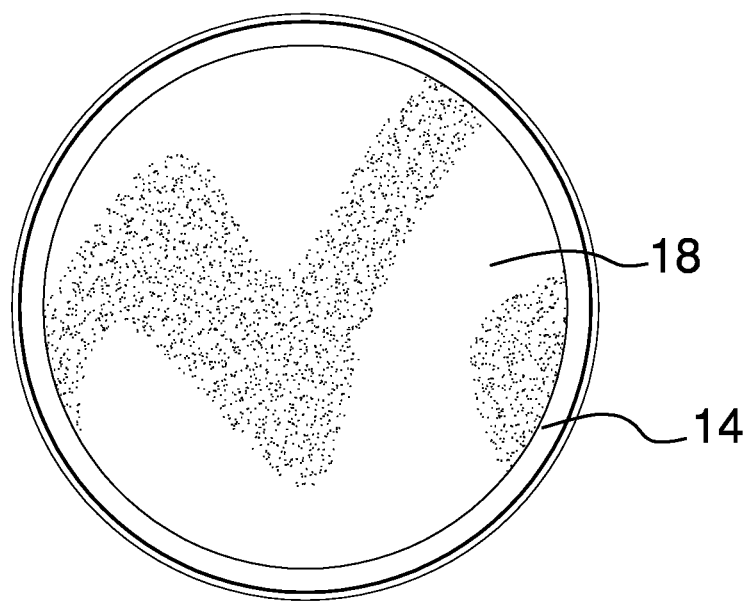
FIG. 2 is a bottom plan view of an embodiment of the disclosure.
Figure 3:
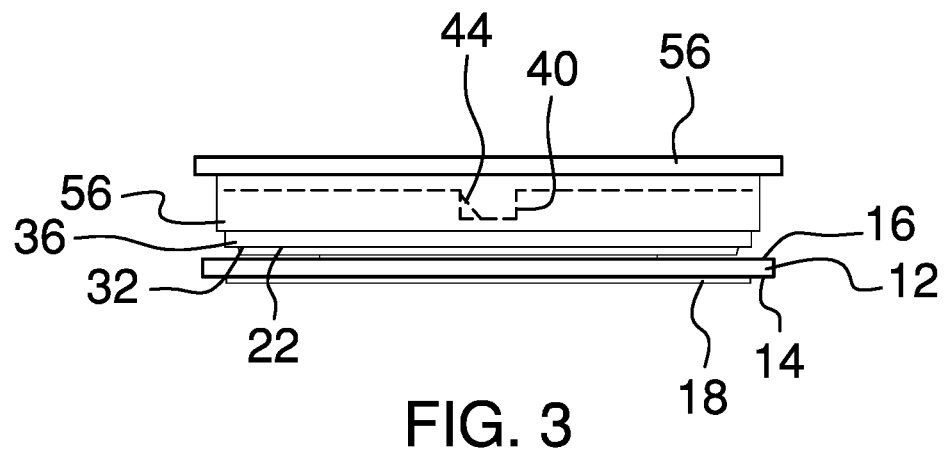
FIG. 3 is a front elevation view of an embodiment of the disclosure.
Figure 4:
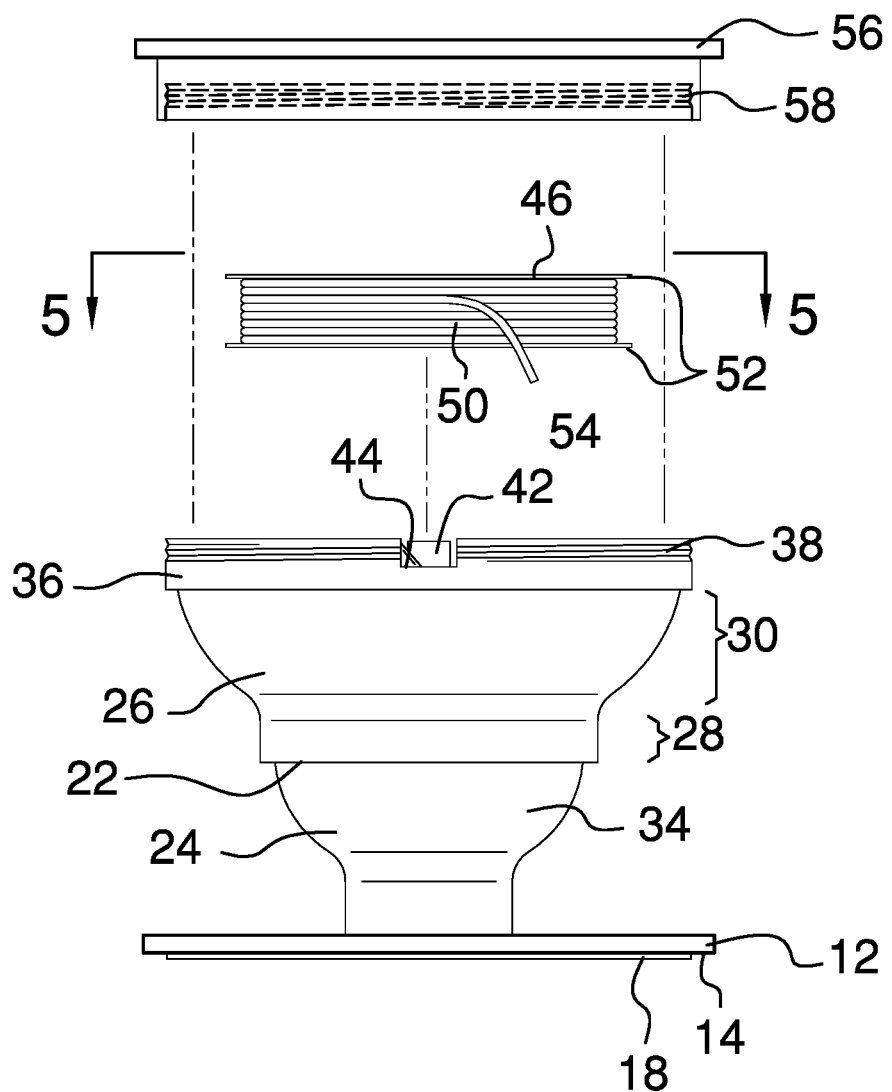
FIG. 4 is an exploded view of an embodiment of the disclosure.
Figure 5:
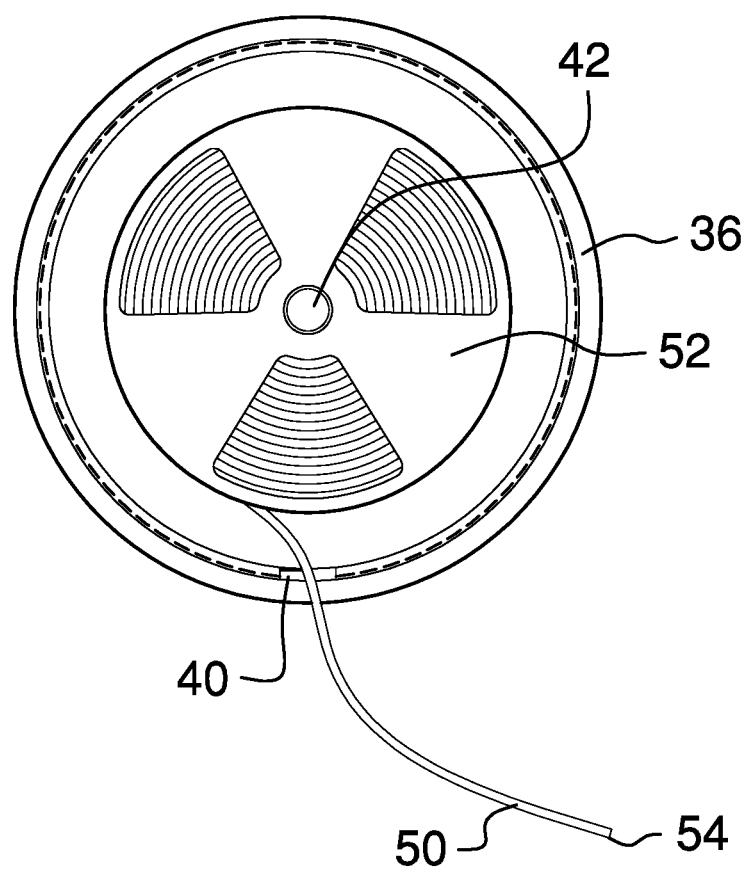
FIG. 5 is a cross-sectional view along the line 5-5 of FIG. 4 of an embodiment of the disclosure.

With reference now to the drawings, and in particular to FIGS. 1 through 5 thereof, a new phone accessory device embodying the principles and concepts of an embodiment of the disclosure and generally designated by the reference numeral 10 will be described.

As best illustrated in FIGS. 1 through 5, the phone grip floss dispenser apparatus 10 generally comprises a base 12 being circular and having a base inner side 14 and a base outer side 16. An adhesive 18 is coupled to the base inner side 14 and is configured to secure the base 12 to a cellphone or a phone case 20. An expandable grip body 22 has a lower portion 24 and an upper portion 26. Each of the lower portion 24 and the upper portion 26 has a rigid neck 28 and a flexible bulbous portion 30. The bulbous portion 30 is foldable over the neck 28 to linearly expand and contract along a central axis of the grip body 22 between a collapsed position 32 and an extended position 34. A cap bottom 36 is circular and is coupled to the upper portion 26. The cap bottom 36 has a threaded outer lip 38 having a notch 40 and a central spool shaft 42. A cutter 44 is triangular and is coupled within the notch 40. A floss spool 46 is coupled to the cap bottom 36. The floss spool 46 has a spool body 48. A length of dental floss 50 is windingly coupled around the spool body 48. The spool body 48 has a pair of trefoil shaped hubs 52 and is rotatably coupled around the spool shaft 42 of the cap bottom 36. A distal end 54 of the length of dental floss 50 is dispensable through the notch 40 of the outer lip 38. The length of dental floss 50 is severable on the cutter 44. A cap top 56 is coupled to the cap bottom 36. The cap top 56 is circular and has an inner threading 58 selectively engageable with the outer lip 38 of the cap bottom 36 to secure the floss spool 46. The cap top 56 may have a logo 60.

In use, the adhesive 18 is coupled to the cellphone or the phone case 20. The user pulls the expandable grip body 22 to expand the bulbous portion 30 to the extended position 34. The length of dental floss 50 is coupled to the spool body 48 of the floss spool 46. The user pulls the length of dental floss 50 through the notch 40 of the outer lip 38 and cuts the length of dental floss 50 with the cutter 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A phone grip floss dispenser apparatus comprising:
a base, the base having a base inner side and a base outer side;
an adhesive coupled to the base, the adhesive being coupled to the base inner side and being configured to secure the base to a cellphone;
an expandable grip body, the grip body having a lower portion and an upper portion, each of the lower portion and the upper portion being foldable to move the grip body between a collapsed position and an extended position;
a cap bottom coupled to the grip body, the cap bottom being coupled to the upper portion and having a threaded outer lip having a notch, the cap bottom having a central spool shaft;
a floss spool coupled to the cap bottom, the floss spool having a spool body and a length of dental floss windingly coupled around the spool body, the spool body being rotatably coupled around the spool shaft of the cap bottom, a distal end of the length of dental floss being dispensable through the notch of the outer lip; and
a cap top coupled to the cap bottom, the cap top having an inner threading selectively engageable with the outer lip of the cap bottom to secure the floss spool.

2. The phone grip floss dispenser apparatus of claim 1 further comprising each of the base, the cap bottom, and the cap top being circular.

3. The phone grip floss dispenser apparatus of claim 1 further comprising a cutter coupled to the cap bottom, the cutter being triangular and coupled within the notch, the length of dental floss being severable on the cutter.

4. The phone grip floss dispenser apparatus of claim 1 further comprising each of the lower portion and the upper portion having a rigid neck and a flexible bulbous portion, the bulbous portion being foldable over the neck to linearly expand and contract along a central axis of the grip body.

5. The phone grip floss dispenser apparatus of claim 1 further comprising the spool body having a pair of trefoil shaped hubs.

6. The phone grip floss dispenser apparatus of claim 1 further comprising the cap top having a logo.

7. A phone grip floss dispenser apparatus comprising:
a base, the base being circular and having a base inner side and a base outer side;
an adhesive coupled to the base, the adhesive being coupled to the base inner side and being configured to secure the base to a cellphone;
an expandable grip body, the grip body having a lower portion and an upper portion, each of the lower portion and the upper portion having a rigid neck and a flexible bulbous portion, the bulbous portion being foldable over the neck to linearly expand and contract along a central axis of the grip body between a collapsed position and an extended position;
a cap bottom coupled to the grip body, the cap bottom being circular and coupled to the upper portion, the cap bottom having a threaded outer lip having a notch, the cap bottom having a central spool shaft;
a cutter coupled to the cap bottom, the cutter being triangular and coupled within the notch;
a floss spool coupled to the cap bottom, the floss spool having a spool body and a length of dental floss windingly coupled around the spool body, the spool body having a pair of trefoil shaped hubs, the spool body being rotatably coupled around the spool shaft of the cap bottom, a distal end of the length of dental floss being dispensable through the notch of the outer lip, the length of dental floss being severable on the cutter; and
a cap top coupled to the cap bottom, the cap top being circular and having an inner threading selectively engageable with the outer lip of the cap bottom to secure the floss spool, the cap top having a logo.

8. A phone grip floss dispenser apparatus and phone case combination comprising:
a phone case, the phone case being configured to secure a cellphone;
a base coupled to the phone case, the base being circular and having a base inner side and a base outer side, the base inner side being coupled to a case back of the phone case;
an expandable grip body, the grip body having a lower portion and an upper portion, each of the lower portion and the upper portion having a rigid neck and a flexible bulbous portion, the bulbous portion being foldable over the neck to linearly expand and contract along a central axis of the grip body between a collapsed position and an extended position;
a cap bottom coupled to the grip body, the cap bottom being circular and coupled to the upper portion, the cap bottom having a threaded outer lip having a notch, the cap bottom having a central spool shaft;
a cutter coupled to the cap bottom, the cutter being triangular and coupled within the notch;
a floss spool coupled to the cap bottom, the floss spool having a spool body and a length of dental floss windingly coupled around the spool body, the spool body having a pair of trefoil shaped hubs, the spool body being rotatably coupled around the spool shaft of the cap bottom, a distal end of the length of dental floss being dispensable through the notch of the outer lip, the length of dental floss being severable on the cutter; and a cap top coupled to the cap bottom, the cap top being circular and having an inner threading selectively engageable with the outer lip of the cap bottom to secure the floss spool, the cap top having a logo.

* * * * *